United States Patent [19]

Horvath et al.

[11] Patent Number: 4,633,983

[45] Date of Patent: Jan. 6, 1987

[54] STRUT DAMPER WITH BASE VALVE AND CUP RETENTION

[75] Inventors: Richard A. Horvath; William E. Rank; James E. Whelan, all of Dayton, Ohio

[73] Assignee: General Motors Corporation, Detroit, Mich.

[21] Appl. No.: 333,009

[22] Filed: Dec. 21, 1981

Related U.S. Application Data

[63] Continuation of Ser. No. 110,212, Jan. 7, 1980, abandoned.

[51] Int. Cl.$^4$ .............................................. F16F 9/34
[52] U.S. Cl. .............................................. 188/322.14
[58] Field of Search ................... 188/322.14, 322.13, 188/322.19, 322.22, 322.11, 322.16-322.18, 315, 314, 280-282, 321.11, 318, 317; 280/668, 696; 267/8 R

[56] References Cited

U.S. PATENT DOCUMENTS

| | | | |
|---|---|---|---|
| 2,697,496 | 12/1954 | McIntyre | 188/322.14 |
| 2,992,015 | 7/1961 | Halford et al. | 267/8 R |
| 3,294,391 | 12/1966 | Smith et al. | 188/322.14 |
| 3,321,051 | 5/1967 | Heckethorn | 188/315 X |
| 3,527,451 | 9/1970 | Long, Jr. | 188/315 X |
| 3,757,910 | 9/1973 | Palmer | 188/322.14 |
| 3,874,487 | 4/1975 | Keijzer et al. | 188/315 X |
| 4,026,578 | 5/1977 | Mattson | 280/668 X |
| 4,076,276 | 2/1978 | Wijnhoven et al. | 188/315 X |
| 4,105,193 | 8/1978 | Long, Jr. | 188/315 X |
| 4,105,222 | 8/1978 | Buchwald | 280/668 |
| 4,175,771 | 11/1979 | Muzechuk et al. | 267/8 R X |
| 4,238,009 | 12/1980 | Wössner et al. | 188/315 |

FOREIGN PATENT DOCUMENTS

| | | | |
|---|---|---|---|
| 503444 | 6/1954 | Canada | 188/322.14 |
| 988503 | 4/1965 | United Kingdom | 280/668 |

*Primary Examiner*—Douglas C. Butler
*Attorney, Agent, or Firm*—Charles R. White

[57] ABSTRACT

Suspension strut and damper assembly in which the cylinder tube of the hydraulic damper carries a base valve which has arcuately spaced foot pads on the lower surface thereof which seat within the confines of the base cup in a manner so as to limit movement of the cylinder tube relative to the base cup and reservoir tube extending upwardly therefrom.

4 Claims, 3 Drawing Figures

U.S. Patent      Jan. 6, 1987      4,633,983
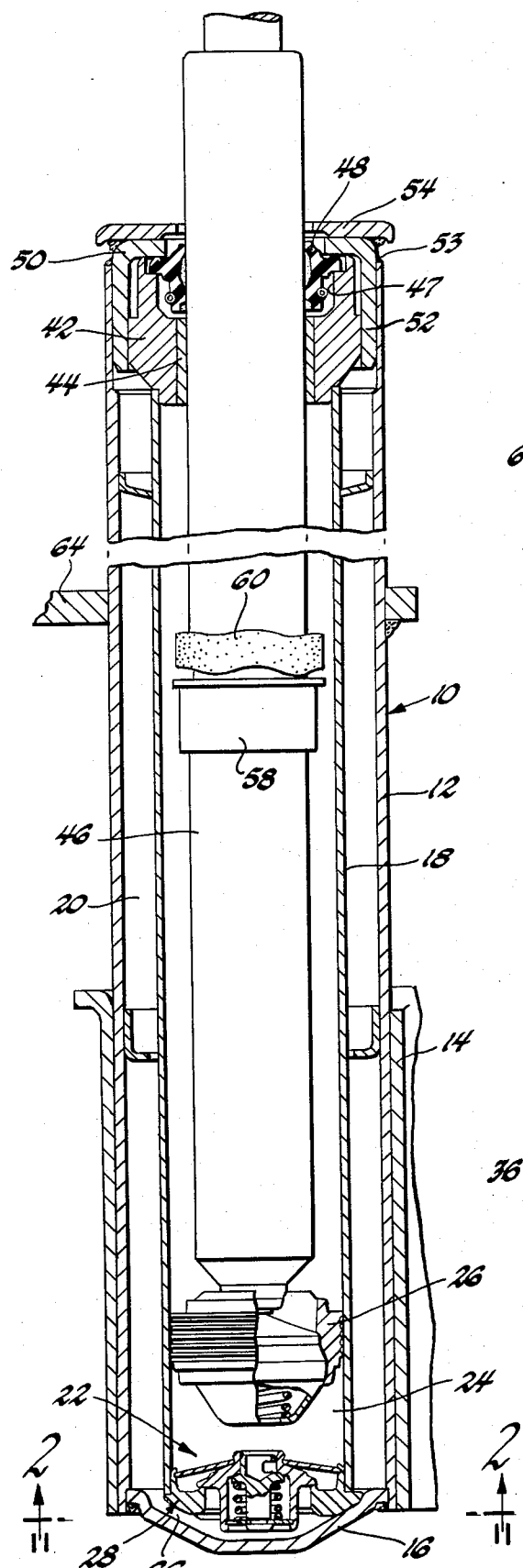
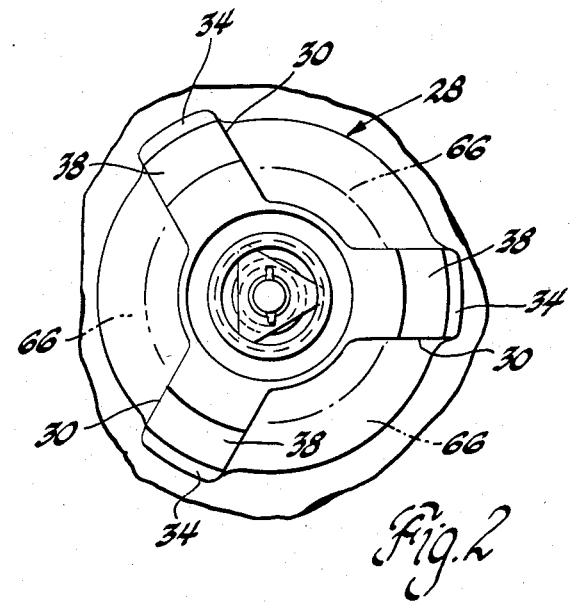
Fig. 2
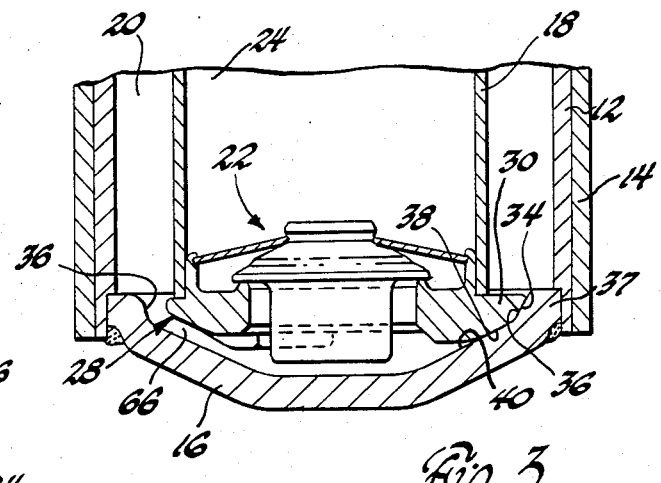
Fig. 3
Fig. 1

STRUT DAMPER WITH BASE VALVE AND CUP RETENTION

This is a continuation of application Ser. No. 110,212, filed Jan. 7, 1980, now abandoned.

This invention relates to vehicle suspension struts in which the base valve of a cylinder tube of a damper employed therein is provided with arcuately spaced support pads to closely fit the sloped bottom surface and the annular perimeter wall of a base cup to effectively eliminate movement of the cylinder tube relative to the base cup to thereby provide improved retention of the cylinder tube in the base cup.

In this invention, a hydraulic damper or shock absorber is provided with a base valve having a valve body with arcuately spaced and downwardly extending pads formed integrally thereon with lower contact surfaces inclined to match the slope of the inversely coned inner surface of the base cup. These pads also have end surfaces which engage the inner surface of an annular rim of the base cup. With the cylinder tube axially preloaded within the reservoir tube and with the surface-to-surface engagement described, the pads of base valve are in effect locked in position and the cylinder tube and base valve are fixed relative to the base cup and the attached reservoir tube. Additionally, with the pads engaging the inner surface of the base cup, clearance is provided for fluid flow between the reservoir and the compression chamber of the damper while providing for improved axial and radial support of the base valve and cylinder tube within the strut.

This invention may be advantageously employed in a MacPherson type suspension strut since the pad and base cup construction accommodates high magnitude side loads that occur in such struts, particularly in those where steering loads are imposed through a steering arm coupled to the reservoir tube. With this pad and base cup construction, relative movement between the lower end of the cylinder tube and the base cup is effectively eliminated so that shock absorber operation and service life are optimized. Additionally, with this invention, the assembly of a service cartridge within the reservoir tube is simplified since it does not require a predetermined rotational fit as in prior art construction in which protuberances in the base cup fit into corresponding recesses formed in the lower end of the service cartridge.

A feature, object and advantage of this invention is to provide a new and improved strut damper for an automotive suspension having a preloaded cylinder tube with a base valve assembly formed with a plurality of arcuately spaced pads that have bottom and end surfaces that engage corresponding interior surfaces of a reservoir tube supported base valve cup so that movement of the lower end of the cylinder tube with respect to the reservoir tube is effectively eliminated.

Another feature, object and advantage of this invention is to provide a new and improved suspension strut and damper assembly in which the base valve of the cylinder tube has foot pads disposed in a triangulated pattern which has first contact surfaces that engage the sloped inner surface of the base cup and second arcuately spaced end contact surfaces which engage the inner wall of the rim of the base cup at points to provide improved retention of the end of the cylinder tube in the base cup under high side load conditions including loads from high steer on the strut damper.

Another feature, object and advantage of this invention is to provide a new and improved strut damper assembly for a vehicle suspension which incorporates a rotationally steerable support tube having a cylinder tube preloaded therein in which a piston and rod assembly are operatively mounted and further incorporating a new and improved base valve formed with pads extending therefrom which fit within the sloped inner surface of a base cup to provide improved retention of the cylinder tube in the base cup.

These and other features, objects and advantages of this invention will be more apparent from the following detailed description and drawings in which:

FIG. 1 is a side view partly in section of a suspension strut and damper assembly which incorporates the new and improved base cup and cylinder end locking construction of this invention;

FIG. 2 is an end view taken along lines 2—2 of FIG. 1 as viewed in the direction of the indicator arrows; and FIG. 3 is a side view of the end portion of the strut of FIG. 2 showing the base valve assembly therein partly in section and partly in elevation.

Turning now in greater detail to the drawing, there is shown in FIG. 1 a MacPherson strut 10 for a vehicle suspension comprising rotationally steerable cylindrical reservoir tube 12 having a mounting bracket 14 welded or otherwise secured to the lower end thereof for support of a vehicle road wheel assembly which is not shown. The reservoir tube 12 is closed at its lower end by a base cup 16 having a sloped bottom surface welded thereto. Axially preloaded onto the base cup and within the reservoir tube is an elongated cylinder tube 18. The cylinder tube 18 has a smaller diameter than the reservoir tube 12 and cooperates therewith to provide a reservoir 20 which contains a quantity of oil used as a damping medium in this strut. The cylinder tube has a base valve 22 secured in the lower end thereof which controls the transit of oil between the reservoir 20 and a compression chamber 24 formed in the cylinder tube 18 beneath valved piston assembly 26 slidably mounted therein.

The base valve 22 has conventional valving construction such as disclosed in U.S. Pat. No. 4,105,193 issued Aug. 8, 1978 for Shock Absorber and Leveling Unit with Auxiliary Damping Device for Vehicle Suspension hereby incorporated by reference. The base valve 22 further has an annular valve body 28 which has three support pads 30 equally spaced in a triangular pattern formed on the underside thereof. These pads terminate in end surfaces 34 which extend upwardly and contact the corresponding upwardly extending annular inner side wall surface 36 of the rim 37 of the base cup 16. In addition to contact by the end surfaces 34, the pads 30 have inclined bottom surfaces 38 that engage the correspondingly inclined inner surface 40 of the base cup 16. With the arcuately spaced end surfaces of the pads 30 engaging the rim wall 37 of the base cup and with bottom surfaces 38 engaging the inner surface 40 of the base cup 16, improved support of the end of the cylinder tube 18 within the base cup 16 is provided. In particular, this support is such that side movement of the cylinder tube 18 relative to the reservoir tube 12 from loads including rotational steering loads imparted to the reservoir and connected cylinder tube is effectively eliminated.

The upper end of the cylinder tube 18 is connected to a cylindrical piston rod guide 42 having an inner bushing 44 slidably receiving piston rod 46 attached at its inner end to piston assembly 26. The piston rod guide 42 is formed with a counter bore 47 in the upper end thereof which receives an annular elastomeric seal 48 which surrounds the piston rod 32 extending therethrough. Seal cover 50 holds the seal 48 in the counter bore 47 and has inner cylindrical wall 52 sandwiched between the outer wall of piston rod guide 42 and the inner wall of the reservoir tube 12. The reservoir tube 12 is secured to the seal cover by annular weld 53. When the seal cover 50 is secured in place by weld 53, the cylinder tube 18 is axially loaded so that the pads 30 firmly engage the inner surface 40 of the base cup 16 and will not move relative to the base cup when steering loads are impressed on the reservoir tube 12. A bumper plate 54 is welded to the top of the seal cover 50 to contact an elastomeric compression bump stop such as disclosed in U.S. Pat. No. 4,175,771, issued Nov. 27, 1979 to Muzechuk et al. for Resilient Mounting Means for MacPherson Strut hereby incorporated by reference. The end of the piston rod 32 is attached to the vehicle through a mounting as disclosed in this referenced application. A collar 58 secured to the piston rod 32 within the cylinder tube 18 supports an elastomeric bumper 60 which is adapted to engage the lower surface of the piston rod guide 42 to limit the extension of the shock absorber or damper of this strut.

Element 64 represents a portion of a steering arm secured to the outer reservoir tube 12 which is operatively connected to the steering linkage so that the strut and supported wheel may be turned to provide for vehicle steering. Even with large magnitude side loads imposed by such steering inputs, the reservoir and cylinder tube are maintained in their relative positions while the clearances 66 between the base valve body 28 and the base cup 16 provide passage for the transit of oil between the reservoir 20 and compression chamber 24. With this invention, assembly is improved over prior constructions since the service cartridge can be installed in any rotational position relative to the base cup.

While a preferred embodiment of the invention has been shown and described to illustrate the invention, other modifications will become apparent to those skilled in the art. Accordingly, the scope of this invention is set forth in the following claims.

The embodiments of the invention in which an exclusive property or privilege is claimed are defined as follows:

1. A steerable suspension strut and damper assembly for a vehicle comprising a cylinder tube having upper and lower ends and having a damping fluid therein, a piston mounted for axial reciprocal movement in said cylinder tube, a piston rod attached to said piston and extending outwardly from the upper end of said cylinder tybe, closure means closing the upper end of said cylinder tube and having an opening therein for slidably receiving said piston rod, a reservoir tube disposed around said cylinder tube and cooperating therewith to form a fluid reservoir, a steering arm connected to said reservoir tube for turning said reservoir tube and steering said strut, base valve means operatively supported on the lower end of said cylinder tube, base cup means having an annular rim secured to the end of said reservoir tube for supporting said cylinder tube and said base valve means, said base valve means having a valve body with a plurality of arcuately spaced foot pad means on the lower surface thereof, each of said foot pad means having a bottom surface for directly contacting the interior surface of said base cup means to define a plurality of fluid flow passages therebetween leading between said cylinder tube and said reservoir, each of said foot pads having end wall means at the outermost radial extremity thereof extending at a predetermined angle from the associated bottom surface directly engaging the inner side wall surface of said annular rim of said base cup means to limit side movement of the lower end of said cylinder tube with respect to said reservoir tube under high side loads when said strut is steered.

2. A steerable suspension strut and damper assembly for a vehicle comprising a cylinder tube having upper and lower ends and having a damping fluid therein, a piston mounted for axial reciprocal movement in said cylinder tube, a piston rod attached to said piston and extending outwardly from the upper end of said cylinder tube, rod guide means closing the upper end of said cylinder tube and having an opening therein for slidably receiving said piston rod, a reservoir tube disposed around said cylinder tube and cooperating therewith to form a fluid reservoir, steering arm means attached to said reservoir tube for turning the same and steering said strut, closure means for the upper end of said assembly fixed to said reservoir tube, base valve means operatively supported on the lower end of said cylinder tube, base cup means having a conical inner surface inclined upwardly at a first predetermined angle and having a continuous annular rim secured to the end of said reservoir tube for supporting said cylinder tube and said base valve means, said rim having an inner annular side wall extending upwardly from said conical inner surface at a second predetermined angle greater than said first predetermined angle, said base valve means having a valve body with a plurality of discrete arcuately-spaced foot pad means extending downwardly from the lower surface thereof, each of said foot pad means having a bottom surface for directly contacting the conical inner surface of said base cup means to provide axial support for said cylinder tube and to define a plurality of fluid flow passages therebetween leading between said cylinder tube and said reservoir, each of said foot pads having end wall means at the outer radial extremity thereof inclining upwardly from said bottom surface thereof at said second predetermined angle for directly engaging the inner side wall surface of said annular rim of said base cup means to provide radial support for said cylinder tube to thereby limit side movement of the lower end of said cylinder tube with respect to said reservoir tube when said strut is steered by said arm and high side loads are developed between said base cup means and said base valve means.

3. A steerable suspension strut and damper assembly for a vehicle comprising a cylinder tube having a damping fluid therein, a piston mounted for axial reciprocal movement in said cylinder tube, a piston rod attached to said piston and extending outwardly from one end of said cylinder tube, a rod guide for said piston fixed to said one end of said cylinder tube, closure means for said assembly contacting said rod guide for exerting an axial load on said cylinder tube through said rod guide, said closure means having an opening therein for said piston rod, a steerable reservoir tube for attachment with a road wheel assembly and disposed around said cylinder tube and cooperating therewith to form a fluid reservoir, steering arm means attached to said reservoir tube for turning said reservoir tube and steering the vehicle, base valve means operatively supported on the inner end of said cylinder tube, base cup means secured to the end of said reservoir tube for receiving said base valve means, said base cup means having a conical inner surface inclined upwardly at a predetermined angle and having an annular rim with an inner annular side wall extending upwardly from said inclined inner wall at a second predetermined angle greater than said first predetermined angle, said base valve means having a valve body, a plurality of arcuately spaced foot pad means extending downwardly from the lower surface of said valve body, each of said foot pad means having a bottom surface for directly contacting the conical inner surface of said base cup means for axial support of said cylinder tube and to define a plurality of fluid flow passages therebetween leading between said cylinder tube and said reservoir, each of said foot pad means having outer end wall means at the outermost radial extremity thereof extending at a predetermined angle upwardly from said bottom surface thereof for directly engaging the inner annular side wall of said rim to provide radial support for said cylinder tube, said foot pad means and said base cup being frictionally engaged to an extent substantially eliminating relative movement of the lower end of said cylinder tube with respect to said reservoir tube on steering input to said reservoir tube by said steering arm for turning said reservoir tube.

4. A steerable suspension strut and damper assembly for a vehicle comprising a cylinder tube having a dampting fluid therein, a piston mounted for axial reciprocal movement in said cylinder tube, a piston rod attached to said piston and extending outwardly from one end of said cylinder tube, a rod guide for said piston rod closing the upper end of said cylinder tube, closure means for said assembly and cooperating with said rod guide exerting an axial load on said cylinder tube, said closure means having an opening therein for receiving said piston rod, a rotatably steerable reservoir tube disposed around said cylinder tube and cooperating therewith to form a reservoir for damping fluid base valve means operatively supported by the inner end of said cylinder tube, steering arm means attached to said reservoir tube for turning said reservoir tube and steering said strut, base cup means having an annular rim secured to the end of said reservoir tube for axially and radially supporting said base valve means, said base valve means having a valve body, a plurality of arcuately-spaced and downwardly extending foot pad means on the lower surface of said valve body, each of said foot pad means having a bottom surface for contacting the interior surface of said base cup means to support said base valve means and said cylinder tube thereon while providing a plurality of fluid flow Passages therebetween leading between said cylinder tube and said reservoir, each of said pads having discrete end wall means at the outermost end thereof extending at a predetermined angle upwardly from the bottom surface thereof for directly engaging the inner side wall of the rim of said base cup to provide radial support for said cylinder tube to thereby limit side movement of the lower end of said cylinder tube with respect to said reservoir tube in response to turning effort applied to said reservoir tube and development of side loads between said base valve means and base cup means.

* * * * *